US007060212B2

(12) United States Patent
Bane et al.

(10) Patent No.: US 7,060,212 B2
(45) Date of Patent: Jun. 13, 2006

(54) ROOF TILES, ROOF TILE LAYOUT, AND METHOD OF MANUFACTURE

(75) Inventors: Stanley Sherman Bane, Highlands Ranch, CO (US); Gary Lee Manlove, Larkspur, CO (US)

(73) Assignee: CRH Oldcastle, Inc., Atlanta, GA (US)

( * ) Notice: Subject to any disclaimer, the term of this patent is extended or adjusted under 35 U.S.C. 154(b) by 481 days.

(21) Appl. No.: 10/409,802

(22) Filed: Apr. 9, 2003

(65) Prior Publication Data

US 2004/0074203 A1 Apr. 22, 2004

Related U.S. Application Data

(62) Division of application No. 10/092,940, filed on Mar. 7, 2002, now Pat. No. 6,604,336, which is a division of application No. 09/200,491, filed on Nov. 25, 1998, now Pat. No. 6,381,914.

(60) Provisional application No. 60/090,976, filed on Jun. 29, 1998.

(51) Int. Cl.
*B29C 47/00* (2006.01)

(52) U.S. Cl. ........................ 264/148; 264/156; 264/160

(58) Field of Classification Search ..................... None
See application file for complete search history.

(56) References Cited

U.S. PATENT DOCUMENTS 1,516,238 A * 11/1924 Mortimer ........................ 83/45
1,812,654 A * 6/1931 Kirschbraun .................. 83/302
1,952,828 A * 3/1934 Volkhardt .................. 264/146
1,965,341 A * 7/1934 Houston ........................ 83/39
3,242,573 A * 3/1966 Noel ........................... 33/1 G
3,464,421 A * 9/1969 Sherrill et al. ............. 131/61.1
3,790,071 A * 2/1974 Estephanian .................. 234/1
4,574,536 A 3/1986 Bamber et al.
4,666,648 A * 5/1987 Brittain ...................... 264/145
4,856,395 A * 8/1989 Smith et al. .................. 83/158
5,017,320 A * 5/1991 Velazquez Garcia ........ 264/148
5,070,671 A 12/1991 Fifield et al.
5,214,895 A 6/1993 Fifield
5,223,200 A * 6/1993 Schulz et al. ............... 264/145
D338,541 S 8/1993 Fifield
5,268,028 A 12/1993 Fifield
5,323,581 A 6/1994 Jakel
D356,873 S 3/1995 Bamber et al.
5,465,547 A 11/1995 Jakel
5,490,360 A 2/1996 Fifield et al.
5,502,940 A 4/1996 Fifield
5,519,975 A 5/1996 Taylor et al.

(Continued)

*Primary Examiner*—Mark Eashoo
(74) *Attorney, Agent, or Firm*—Dinsmore & Shohl LLP

(57) ABSTRACT

Complementary roof tiles for a staggered roof tile layout are provided by: (i) extruding and conveying a composite ribbon; (ii) demarcating the composite ribbon into an alternating succession of a first roof tile type and a second roof tile type by engaging the composite ribbon with an upstream cutting blade and a downstream cutting blade, such that each roof tile type is demarcated at an upstream tile edge by one of the cutting blades and at a downstream tile edge by the other of the cutting blades, and such that a selected one of the roof tile types includes a pair of cut-out portions demarcated along one of the upstream and downstream tile edges on opposite ones of the ribbon side edges; (iii) separating the succession of demarcated roof tile types into distinct roof tiles; and (v) curing the distinct roof tiles to form a set of cured roof tiles.

14 Claims, 10 Drawing Sheets

U.S. PATENT DOCUMENTS 5,743,059 A 4/1998 Fifield
5,772,939 A * 6/1998 Palm et al. ................ 264/145
5,974,756 A 11/1999 Alvarez et al.
5,993,551 A 11/1999 Hahn
6,178,703 B1 1/2001 Noone et al.
6,233,895 B1 5/2001 Evans et al.
6,247,284 B1 6/2001 Alvarez et al.
6,381,914 B1 * 5/2002 Bane et al. ................... 52/536
6,604,336 B1 * 8/2003 Bane et al. .............. 52/745.19
6,804,919 B1 * 10/2004 Railkar ........................ 52/105

* cited by examiner

ROOF TILES, ROOF TILE LAYOUT, AND METHOD OF MANUFACTURE

CROSS REFERENCE TO RELATED APPLICATIONS

The present application is a division of U.S. patent application Ser. No. 10/092,940 ROOF TILES, ROOF TILE LAYOUT, AND METHOD OF MANUFACTURE, filed Mar. 7, 2002, which claims the benefit of U.S. Pat. No. 6,381,914 ROOF TILES, ROOF TILE LAYOUT, AND METHOD OF MANUFACTURE, filed Nov. 25, 1998, which claims the benefit of U.S. Provisional Application Ser. No. 60/090,976, for ROOF TILE, filed Jun. 29, 1998.

BACKGROUND OF THE INVENTION

The present invention relates to roof tiles and more particularly to such tiles which interlock when laid in side by side overlapping relationship to form a roof tile layout.

Conventional interlocking flat roof tiles have a generally rectangular shape with upper and lower surfaces, opposite side edges, top edges, and bottom edges. These tiles may be made from a variety of materials such as clay, polymer bound aggregates, and cementitious materials such as concrete. The cementitious mixture may include sand, or another aggregate, cement, coloring pigment, water, and one or more other additives to facilitate extrusion, prevent growth of fungus, etc. A variety of roof tile designs and manufacturing methods are illustrated in detail in U.S. Pat. No. 5,070,671 (Fifield et al.), U.S. Pat. No. 5,214,895 (Fifield), U.S. Pat. No. 5,490,360 (Fifield et al.), U.S. Pat. No. 5,502,940 (Fifield), and U.S. Pat. No. 5,743,059 (Fifield), the disclosures of which are incorporated herein by reference.

Interlocking roof tiles are often arranged in successive rows of roof tile elements, with the bottom edge of each row overlapping the top edge of a lower row along the roof line. The roof tile layout formed in this manner defines an effective moisture barrier and an aesthetically pleasing appearance. In an effort to improve the aesthetic appearance of such a roof tile layout, some tile installers stagger the successive roof tiles in each row by positioning alternate roof tiles lower or higher on the roof than the directly adjacent roof tiles. This approach is problematic, however, because it is difficult to align the staggered tiles properly. Further, the interlocking and overlooking edges of the roof tiles become exposed when specific tiles are lowered or raised relative to the directly adjacent tiles.

Accordingly, there is a need for a roof tile layout and a system for manufacturing roof tiles that provide for a more effective means by which a staggered roof tile layout may be created. Further, there is a need for such a system and layout that enables efficient manufacture of such roof tiles and efficient and accurate installation of such a roof tile layout.

BRIEF SUMMARY OF THE INVENTION

This need is met by the present invention wherein two complementary roof tile designs, a process and apparatus for manufacturing the complementary roof tiles, and a roof tile layout including the complementary designs are provided.

In accordance with one embodiment of the present invention, a process of manufacturing roof tiles is provided comprising the steps of: (i) extruding a composite ribbon such that the composite ribbon defines an upper surface, a lower surface, and a pair of opposite ribbon side edges; (ii) conveying the composite ribbon from an upstream position to a downstream position along a composite ribbon path; (iii) demarcating the composite ribbon into an alternating succession of a first roof tile type and a second roof tile type by engaging the composite ribbon with an upstream cutting blade and a downstream cutting blade such that each roof tile type is demarcated at an upstream tile edge by one of the cutting blades and at a downstream tile edge by the other of the cutting blades, and such that a selected one of the roof tile types includes a pair of cut-out portions demarcated along one of the upstream and downstream tile edges, the pair of cut-out portions being positioned on opposite ones of the ribbon side edges; (iv) separating the succession of demarcated roof tile types into distinct roof tiles; and (v) curing the distinct roof tiles to form a set of cured roof tiles.

Preferably, the composite ribbon is demarcated such that (i) the first roof tile type includes a first set of nail holes spaced a first distance from one of the upstream and downstream tile edges and a second set of nail holes spaced a second distance from the first set of nail holes along the composite ribbon path; (ii) the second roof tile type includes the pair of cut-out portions and a first set of nail holes spaced the first distance from one of the upstream and downstream tile edges. The composite ribbon may be further demarcated such that the pair of cut-out portions extend the second distance from the other of the second roof tile type upstream and downstream tile edges along the composite ribbon path, whereby the spacing between the first and second sets of nail holes on the first roof tile type along the composite ribbon path matches the extent of the cut-out portions on the second roof tile type along the composite ribbon path. The composite ribbon may be demarcated such that the nail holes extend partially or completely through the composite ribbon between the upper surface and the lower surface. The demarcating step preferably comprises engaging the composite ribbon with the upstream cutting blade and the downstream cutting blade substantially simultaneously and conveying the cutting blade assembly in a direction parallel to the composite ribbon path as the demarcating step is executed.

The process of manufacturing roof tiles may further comprise the steps of (i) conveying a succession of partially cured roof tiles of alternating roof tile types and (ii) stacking said alternating roof tile types in succession to form a cubed product wherein each layer of the cubed product includes equal quantities of the two different roof tile types.

In accordance with another embodiment of the present invention, an apparatus for manufacturing roof tiles is provided comprising a composite ribbon extruder, a conveying mechanism, a cutting blade assembly, a pallet conveying path, and a roof tile curing station. The composite ribbon extruder is arranged to extrude a composite ribbon defining an upper surface, a lower surface, and a pair of opposite ribbon side edges. The conveying mechanism is arranged to move the composite ribbon from an upstream position to a downstream position along a composite ribbon path. The cutting blade assembly includes an upstream cutting blade and a downstream cutting blade arranged to demarcate the composite ribbon into an alternating succession of a first roof tile type and a second roof tile type by engaging the composite ribbon with the upstream cutting blade and the downstream cutting blade. Each roof tile type is demarcated at an upstream tile edge by one of the cutting blades and at a downstream tile edge by the other of the cutting blades. A selected one of the upstream and downstream cutting blades includes a pair of L-shaped cut-out extensions arranged to demarcate a pair of cut-out portions along one of the upstream and downstream tile edges on opposite ones of the ribbon side edges. The pallet conveying path is defined by a succession of demarcated roof tile types separated into distinct roof tiles by the conveying mechanism. The roof tile curing station is positioned along the pallet conveying path and is arranged to cure the distinct roof tiles to form a set of cured roof tiles.

Preferably, the cutting blade assembly further comprises first, second, and third sets of nail hole punches. The first set of nail hole punches is spaced a first distance from a selected one of the upstream cutting blade and the downstream cutting blade. The selected cutting blade includes the pair of L-shaped cut-out extensions. The second set of nail hole punches is spaced a second distance from the first set of nail hole punches along the composite ribbon path. The third set of nail hole punches is spaced the first distance from the other of the upstream cutting blade and the downstream cutting blade. The pair of L-shaped cut-out extensions preferably extend the second distance along the composite ribbon path from the other of the upstream cutting blade and the downstream cutting blade, whereby the spacing between the first and second sets of nail hole punches along the composite ribbon path matches the extent of the cut-out portion along the composite ribbon path. The first set of nail hole punches may be arranged such that the nail holes extend through the composite ribbon between the upper surface and the lower surface.

The apparatus for manufacturing roof tiles may further comprise a stacking assembly arranged to convey a succession of partially cured roof tiles of alternating roof tile types and stack the alternating roof tile types in succession to form a cubed product wherein each layer of the cubed product includes equal quantities of the first tile type and the second tile type.

The upstream cutting blade and the downstream cutting blade may be mechanically coupled to each other for joint movement in the direction of the composite ribbon. Further, a cutting assembly conveyor may be arranged to convey the cutting assembly in a direction parallel to the composite ribbon path.

In accordance with yet another embodiment of the present invention, an apparatus for manufacturing roof tiles is provided comprising a composite ribbon extruder, a conveying mechanism, a cutting blade assembly, a pallet conveying path, and a roof tile curing station. The composite ribbon extruder is arranged to extrude a composite ribbon defining an upper surface, a lower surface, and a pair of opposite ribbon side edges. The conveying mechanism is arranged to move the composite ribbon from an upstream position to a downstream position along a composite ribbon path. The cutting blade assembly includes an upstream cutting blade and a downstream cutting blade arranged to demarcate the composite ribbon into an alternating succession of a first roof tile type and a second roof tile type by engaging the composite ribbon with the upstream cutting blade and the downstream cutting blade. Each roof tile type is demarcated at an upstream tile edge by one of the cutting blades and at a downstream tile edge by the other of the cutting blades and each of the roof tile types define substantially different roof tile structures. The pallet conveying path is defined by a succession of demarcated roof tile types separated into distinct roof tiles by the conveying mechanism. The roof tile curing station is positioned along the pallet conveying path and is arranged to cure the distinct roof tiles to form a set of cured roof tiles.

In accordance with yet another embodiment of the present invention, a roof tile is provided comprising an upper surface, a lower surface, a top edge, a bottom edge, an underlocking side edge, an overlooking side edge, a pair of nail holes provided in the upper surface and spaced a first distance from the top edge, and first and second generally rectangular cut-out portions. The first generally rectangular cut-out portion is formed along the underlocking side edge and extends from the bottom edge in the direction of the top edge. The second generally rectangular cut-out portion is formed along the overlooking side edge and extends from the bottom edge in the direction of the top edge. The first cut-out portion and the second cut-out portion extend substantially the same distance from the bottom edge along the respective side edges.

The upper surface may be substantially planar and the lower surface may be contoured. The pair of nail holes may extend partially or completely through the roof tile between the upper surface and the lower surface. The first cut-out portion may be formed substantially within an underlock portion formed along the underlocking side edge. Similarly, the second cut-out portion may be formed substantially within an overlock portion formed along the overlooking side edge.

In accordance with yet another embodiment of the present invention, a roof tile is provided comprising an upper surface, a lower surface, a top edge, a bottom edge, an underlocking side edge, an overlooking side edge, a longitudinal tile axis extending from the bottom edge to the top edge, and first and second sets of nail holes. The first set of nail holes is provided in the upper surface and is spaced a first distance from the top edge. The second set of nail holes is provided in the upper surface and is spaced a second distance from the first set of nail holes along the longitudinal tile axis. The first set of nail holes and the second set of nail holes are preferably aligned along the longitudinal tile axis.

In accordance with yet another embodiment of the present invention, a staggered roof tile layout is provided comprising a plurality of roof tiles arranged in series of tile rows, wherein at least one of the tile rows includes an alternating succession of a first roof tile type and a second roof tile type. The first roof tile type comprises an upper surface, a lower surface, a top edge, a bottom edge, an underlocking side edge, and an overlooking side edge. The second roof tile type comprises an upper surface, a lower surface, a top edge, a bottom edge, an underlocking side edge, an overlooking side edge, a pair of nail holes provided in the upper surface and spaced a first distance from the top edge, and first and second generally rectangular cut-out portions. The first generally rectangular cut-out portion is formed along the underlocking side edge and extends from the bottom edge in the direction of the top edge. The second generally rectangular cut-out portion is formed along the overlooking side edge and extends from the bottom edge in the direction of the top edge. The first cut-out portion and the second cut-out portion extend substantially the same distance from the bottom edge along the respective side edges.

The underlocking side edge of the first roof tile type engages an overlooking side edge of an adjacent tile of the second roof tile type. The overlooking side edge of the first roof tile type engages an underlocking side edge of an adjacent tile of the second roof tile type. The underlocking side edge of the second roof tile type engages an overlooking side edge of an adjacent tile of the first roof tile type. The overlooking side edge of the second roof tile type engages an underlocking side edge of an adjacent tile of the first roof tile type.

The first cut-out portion of the second roof tile type extends from the bottom edge of the tile of the second type as far as the bottom edge of an adjacent tile of the first type. The bottom edge of the adjacent tile of the first type is substantially aligned with a top-most extent of the first cut-out formed in the tile of the second type and is substantially misaligned relative to the bottom edge of the adjacent tile of the second type. Similarly, the second cut-out portion of the second roof tile type extends from the bottom edge of the tile of the second type as far as the bottom edge of an adjacent tile of the first type. The bottom edge of the adjacent tile of the first type is substantially aligned with a top-most extent of the second cut-out formed in the tile of the second type and is substantially misaligned relative to the bottom edge of the adjacent tile of the second type.

Preferably, the first roof tile type further comprises a longitudinal tile axis extending from the bottom edge to the top edge, a first set of nail holes provided in the upper surface and spaced a first distance from the top edge, and a second set of nail holes provided in the upper surface and spaced a second distance from the first set of nail holes along the longitudinal tile axis. The first set of nail holes and the second set of nail holes are preferably separated along the longitudinal tile axis by a distance that is equal to the extent of the first and second cut-out portions along the respective tile edges. The roof tiles of the first and second types may define substantially identical lengths from the respective top edges to the respective bottom edges, such that respective top edges of the first roof tile type and the second roof tile type are misaligned along the tile row.

In accordance with yet another embodiment of the present invention, a cubed product is provided comprising a plurality of stacked layers of roof tiles of a first roof tile type and a second roof tile type, wherein each layer of the cubed product includes equal quantities of the first tile type and the second tile type, wherein said cubed product defines a series of columns and rows of the first roof tile type and the second roof tile type, wherein adjacent roof tiles in each of the columns comprise different roof tile types, and wherein adjacent roof tiles in each of the rows comprise different roof tile types. The first roof tile type and the second roof tile type define respective show surfaces and each roof tile may include a groove formed in the respective show surfaces. The position of the groove in a tile of the first roof tile type differs from a position of the groove in a tile of the second roof tile type.

Accordingly, it is an object of the present invention to provide roof tiles, a roof tile layout, and a system for manufacturing roof tiles that enables arrangement of a more effective staggered roof tile layout. Further, it is an object of the present invention to do so through more efficient manufacturing and installation processes. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
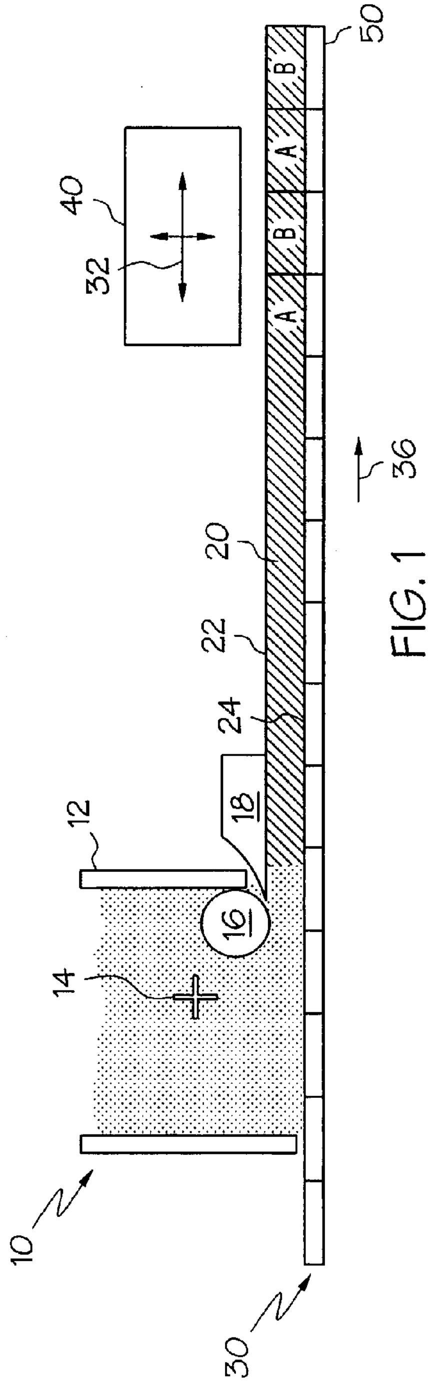
FIG. 1 is a schematic illustration of a process and apparatus for manufacturing roof tiles according to the present invention.

A process and apparatus for manufacturing roof tiles according to the present invention is illustrated in detail in FIGS. 1–7 of the present invention. Referring initially to FIG. 1, the apparatus for manufacturing roof tiles according to the present invention comprises a composite ribbon extruder 10, a conveying mechanism 30, a cutting blade assembly 40, a plurality of roof tile pallets 50, and a roof tile curing station 60 (see FIG. 6).

The composite ribbon extruder 10 may be any commercially available extrusion assembly suitable for extruding roof tile compositions in the form of a composite ribbon 20 having an upper surface 22, a lower surface 24, and side edges 26. The extruder 10 typically comprises an extrusion box 12 for containing the composite to be extruded, a rotating paddle or stir pin 14 for assisting the flow of the composite mixture, a roller 16 for compressing the flow, and a slipper 18 for imparting a contour to the upper surface 22 of the composite ribbon 20. A succession of pallets 50 is driven past the box 12 so that the composition within the box 12 forms on the pallets 50. The pallets 50 are designed to impart a contour to the lower surface 24 of the composite ribbon 20. The conveying mechanism 30 is arranged to move the composite ribbon 20 from an upstream position to a downstream position along a composite ribbon path 36.

Figure 3:
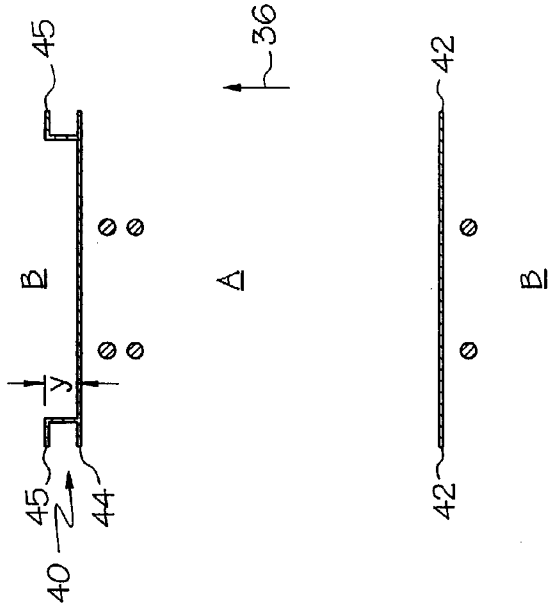
FIG. 3 is a schematic illustration of an alternative cutting blade assembly for use in a process and apparatus for manufacturing roof tiles according to the present invention.
Figure 2:
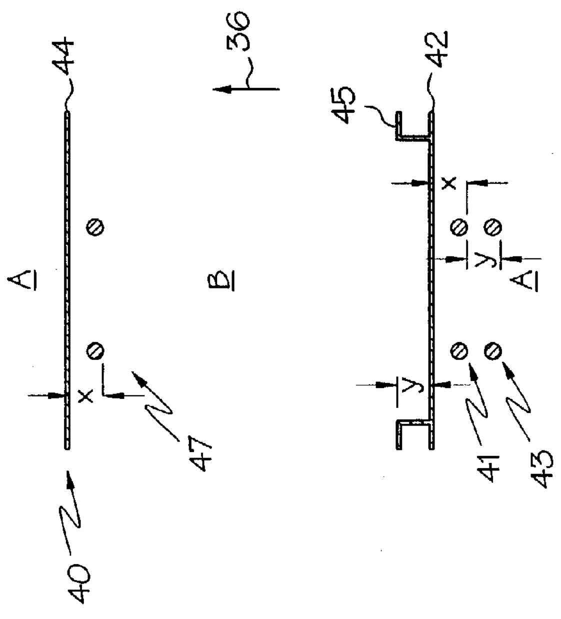
FIG. 2 is a schematic illustration of a cutting blade assembly for use in a process and apparatus for manufacturing roof tiles according to the present invention.

Referring now to FIGS. 2 and 3, where alternative embodiments of a cutting blade assembly 40 are illustrated, the cutting blade assembly 40 includes an upstream cutting blade 42 and a downstream cutting blade 44. It is important to note that the respective cutting blade assemblies 40 illustrated in FIGS. 2 and 3 differ only with respect to the order in which the illustrated structure is presented along the composite ribbon path 36. Specifically, the upstream cutting blade 42 of FIG. 2 is identical to the downstream cutting blade of FIG. 3, while the upstream cutting blade 42 of FIG. 3 is identical to the downstream cutting blade of FIG. 2.

Figure 4:
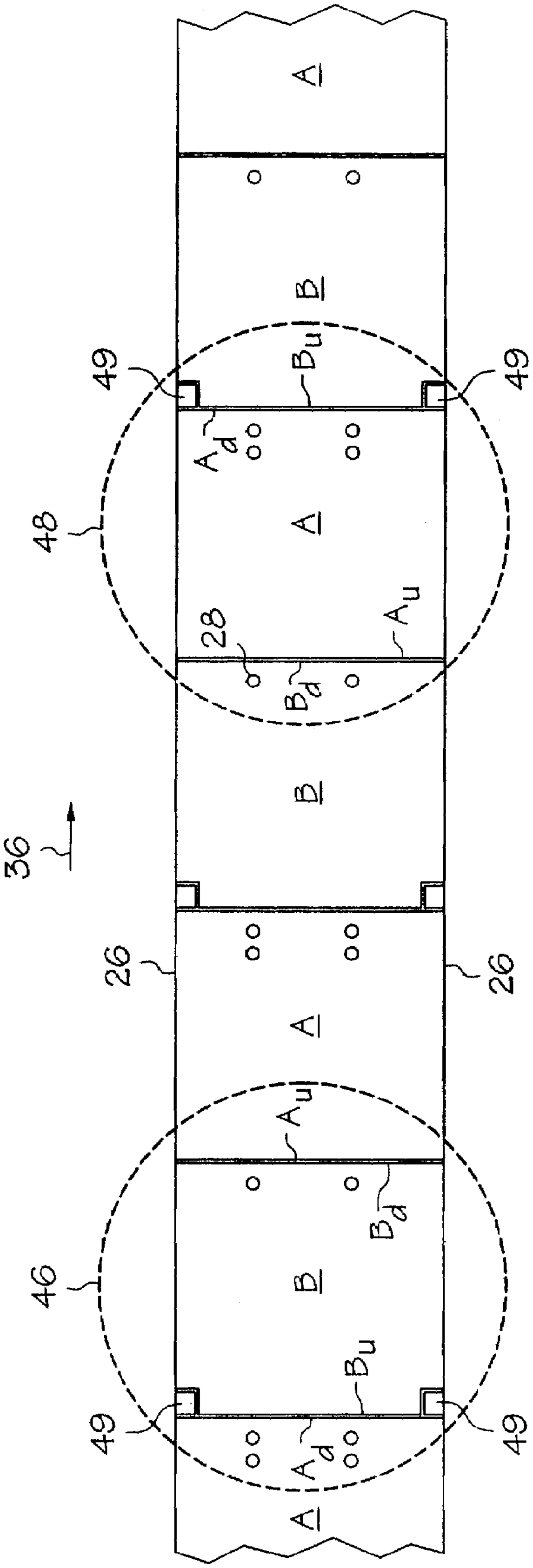
FIG. 4 is a schematic illustration of a composite ribbon, demarcated to form an alternating succession of different roof tile types according to the present invention.
Figure 5:
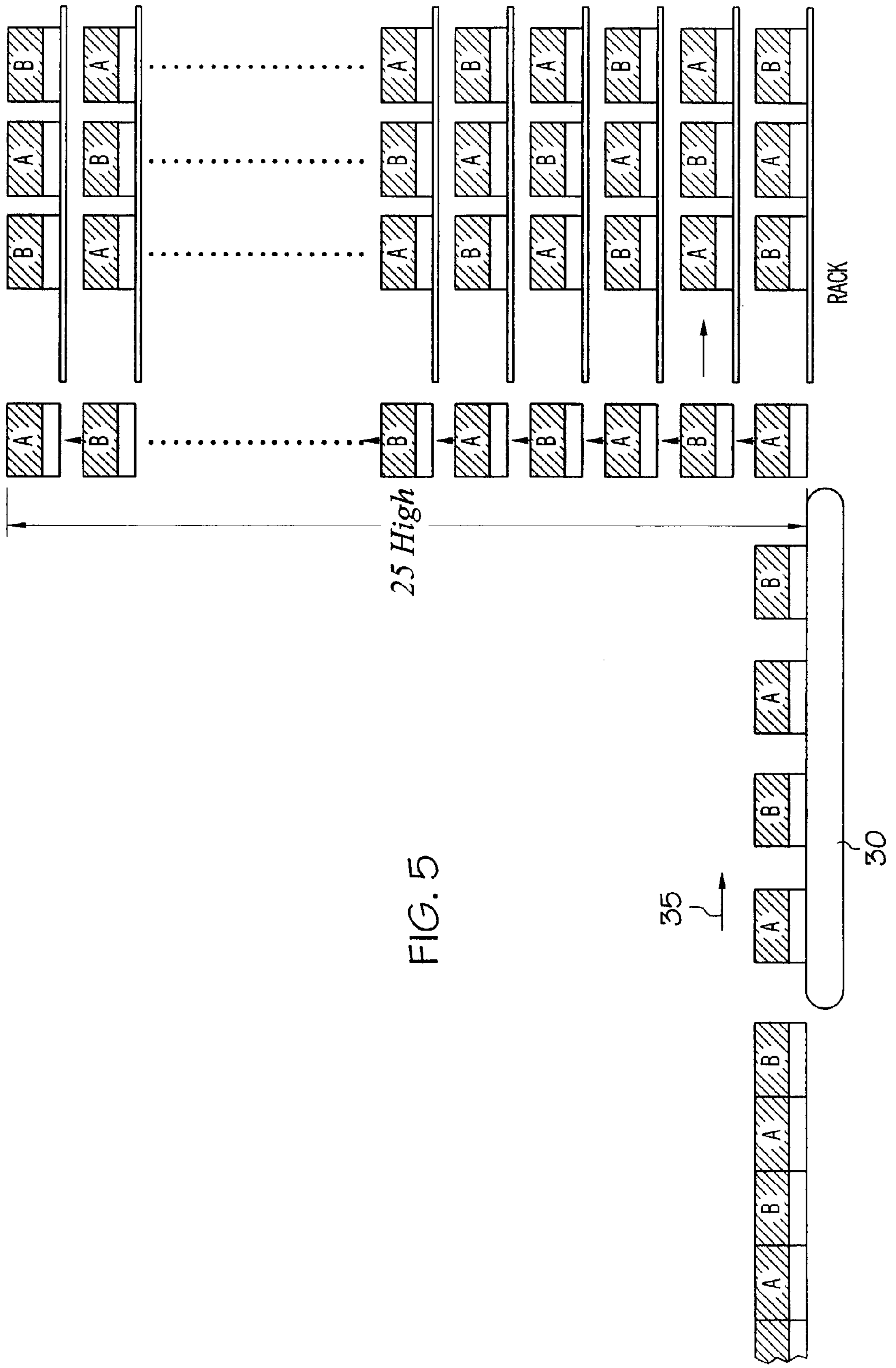
FIGS. 5, 6, 7A, and 7B are schematic illustrations of roof tile conveying, curing and stacking operations utilized in the process and apparatus for manufacturing roof tiles according to the present invention.
Figure 6:
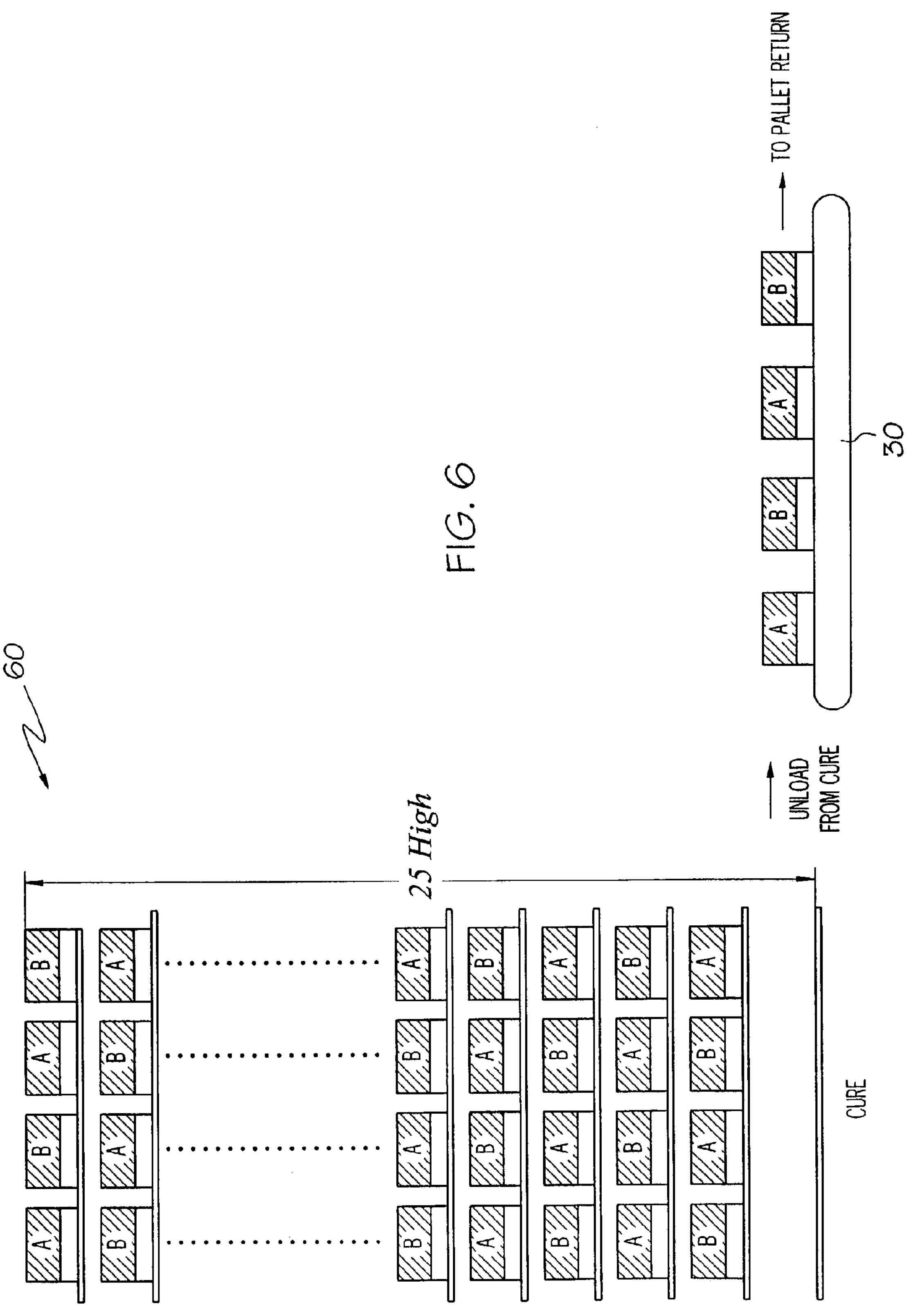

Referring further to FIG. 4, the cutting blade assembly 40 is arranged to demarcate the composite ribbon 20 into an alternating succession of a first roof tile type A and a second roof tile type B by engaging the composite ribbon 20 with the upstream cutting blade 42 and the downstream cutting blade 44 such that each roof tile type A, B is demarcated at an upstream tile edge $A_u$, $B_u$ by one of the cutting blades 42, 44 and at a downstream tile edge $A_d$, $B_d$ by the other of the cutting blades 42, 44. It is important to note that a single engagement stroke of a selected cutting blade demarcates simultaneously the upstream edge of one tile type and the downstream edge of the directly adjacent tile type because the upstream and downstream edges of the adjacent tiles share the same boundary.

Specifically, referring to the demarcation 46 illustrated in FIG. 4, where the cutting blade assembly 40 of FIG. 2 is utilized according to the present invention, one of the type B roof tiles is demarcated at its upstream tile edge $B_u$ by the upstream cutting blade 42 and at its downstream tile edge $B_d$ by the downstream cutting blade 44 while the directly adjacent type-A roof tile in the downstream direction is demarcated at its upstream tile edge $A_u$ by the downstream cutting blade 44 and the directly adjacent type-A roof tile in the upstream direction is demarcated at its downstream tile edge $A_d$ by the upstream cutting blade 42.

Referring to the demarcation 48 illustrated in FIG. 4, where the cutting blade assembly 40 of FIG. 3 is utilized according to the present invention, one of the type A roof tiles is demarcated at its upstream tile edge $A_u$ by the upstream cutting blade 42 and at its downstream tile edge $A_d$ by the downstream cutting blade 44 while the directly adjacent type-B roof tile in the downstream direction is demarcated at its upstream tile edge $B_u$ by the downstream cutting blade 44 and the directly adjacent type-B roof tile in the upstream direction is demarcated at its downstream tile edge $B_d$ by the upstream cutting blade 42.

As is illustrated in FIGS. 2 and 3, either the upstream cutting blade 42 or the downstream cutting blade 44 includes a pair of L-shaped cut-out extensions 45 that extend a distance y along the composite ribbon path 36. The cut-out extensions 45 are arranged to demarcate a pair of cut-out portions 49 along the upstream tile edge $B_u$ of the B-type tiles on opposite ones of the ribbon side edges 26, see FIG. 4. It is contemplated by the present invention that the cut-out portions 49 may alternatively be provided on downstream tile edges of the B-type tiles by reorienting the tile manufacturing process such that the composite ribbon path 36 extends from right-to-left in FIG. 4, as opposed to left-to-right.

The cutting blade assembly 40 also comprises a first set of nail hole punches 41 spaced a first distance x from the cutting blade that includes the pair of L-shaped cut-out extensions 45. Further, the cutting blade assembly 40 comprises a second set of nail hole punches 43 spaced a second distance y from the first set of nail hole punches 41 along the composite ribbon path 36. Finally, the cutting blade assembly comprises a third set of nail hole punches 47 spaced the first distance x from the other cutting blade, i.e., the cutting blade without the pair of L-shaped cut-out extensions 45. The nail hole punches 41, 43, 47 are arranged such that nail holes 28 are created in the composite ribbon 20 upon engagement of the ribbon 20 with the nail hole punches 41, 43, 47. Typically, the nail holes 28 extend partially through the composite ribbon 20 but may extend completely through the composite ribbon 20 between the upper surface 22 and the lower surface 24.

The second set of nail hole punches 43 are spaced from the first set of nail hole punches 41 such that the second distance y is equal to the distance y that the pair of L-shaped cut-out extensions 45 extend along the composite ribbon path 36, as is illustrated in FIGS. 2 and 3. As is described in detail below with reference to FIGS. 10 and 11, by ensuring that the second distance y is equal to the distance y that the pair of L-shaped cut-out extensions 45 extend along the composite ribbon path 36, the roof tiles of the present invention may be utilized to allow precise arrangement of an aesthetically pleasing staggered roof tile layout.

The upstream cutting blade 42, the downstream cutting blade 44, and the nail hole punches 41, 43, 47 are mechanically coupled to one another for joint movement towards the composite ribbon 20. In this manner, the components are arranged to engage the composite ribbon 20 substantially simultaneously. Further, a cutting assembly conveyor is arranged to convey the cutting assembly 40 in a direction parallel to the composite ribbon path 36 as the cutting assembly 40 is moved in the direction of the composite ribbon path 36, as indicated by the directional arrows 32 in FIG. 1. In this manner, the cutting assembly 40 may make precise engagement with the composite ribbon 20 even though the composite ribbon 20 is moving along the composite ribbon path 36.

Referring now to FIGS. 5, 6, 7A, and 7B, the succession of demarcated roof tile types is separated into distinct roof tiles by the conveying mechanism 30 to define a pallet conveying path 35. The roof tile curing station 60 is positioned along the pallet conveying path 35 and is arranged to at least partially cure the distinct roof tiles to form a set of cured roof tiles. Typically, the curing station comprises a curing chamber that is maintained at a high relative humidity and temperature. The curing time is usually in excess of 6 hours. The tiles typically undergo only a partial curing in the curing chamber and are subsequently conveyed to, and stacked, out-of-doors to complete the curing process.

Figure 7A:
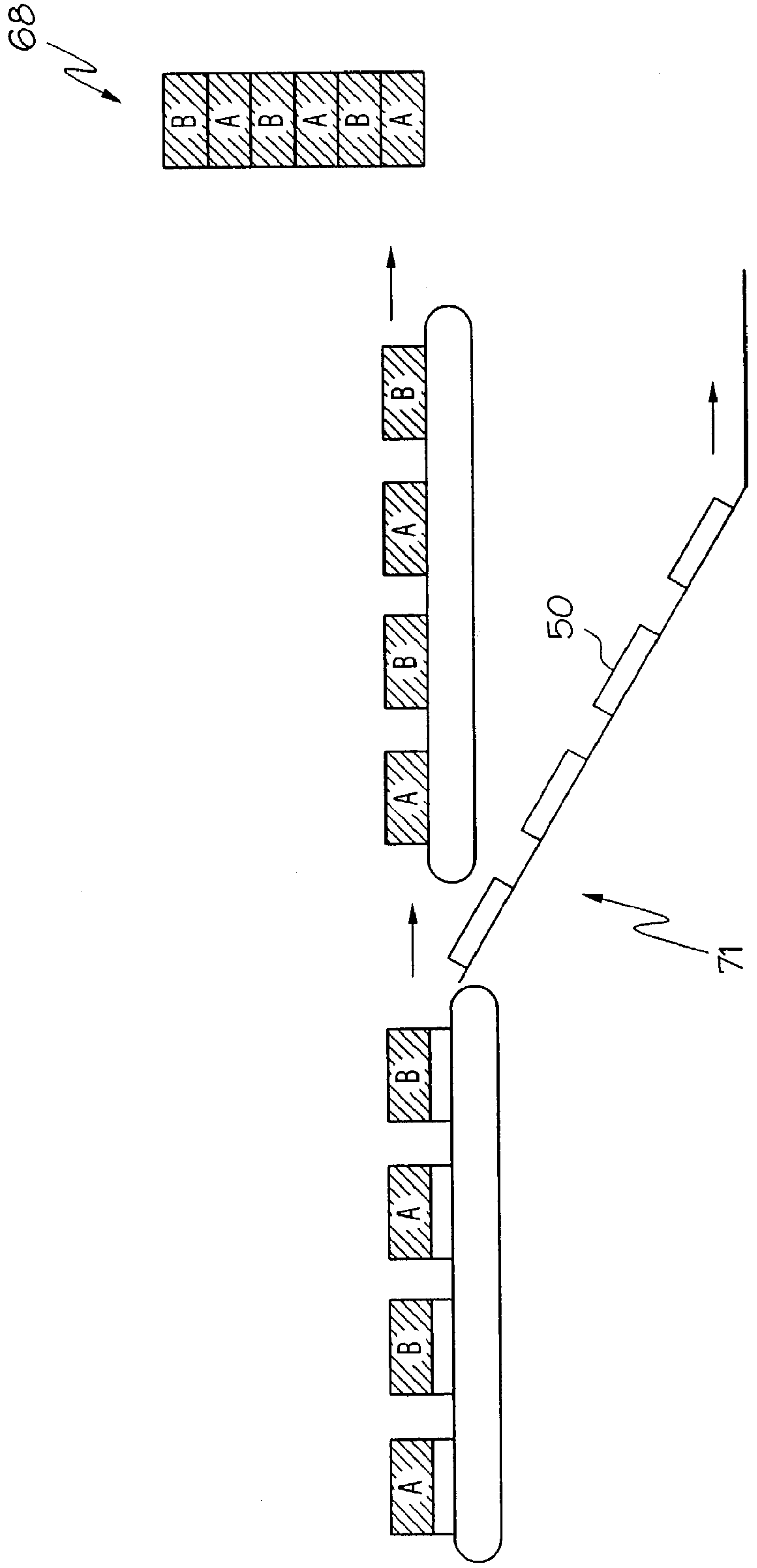

The tiles are conveyed from the curing station 60 in alternating succession to a pallet return section 71 where the tiles A, B and the associated pallets 50 are separated (see FIG. 7A). For example, the tiles may be separated by means of rotating depalleting wheels disposed on opposite sides of the conveyor path. In operation, the wheels successively enter in between the pallets and tiles, with the tiles continuing along the original conveyor path, and the pallets being carried downwards along a different conveyor path, thereby separating the tiles from the pallets. A tile collator assembly 66 forms an alternating tile-type stack 68 of de-palleted roof tiles.

Figure 7B:
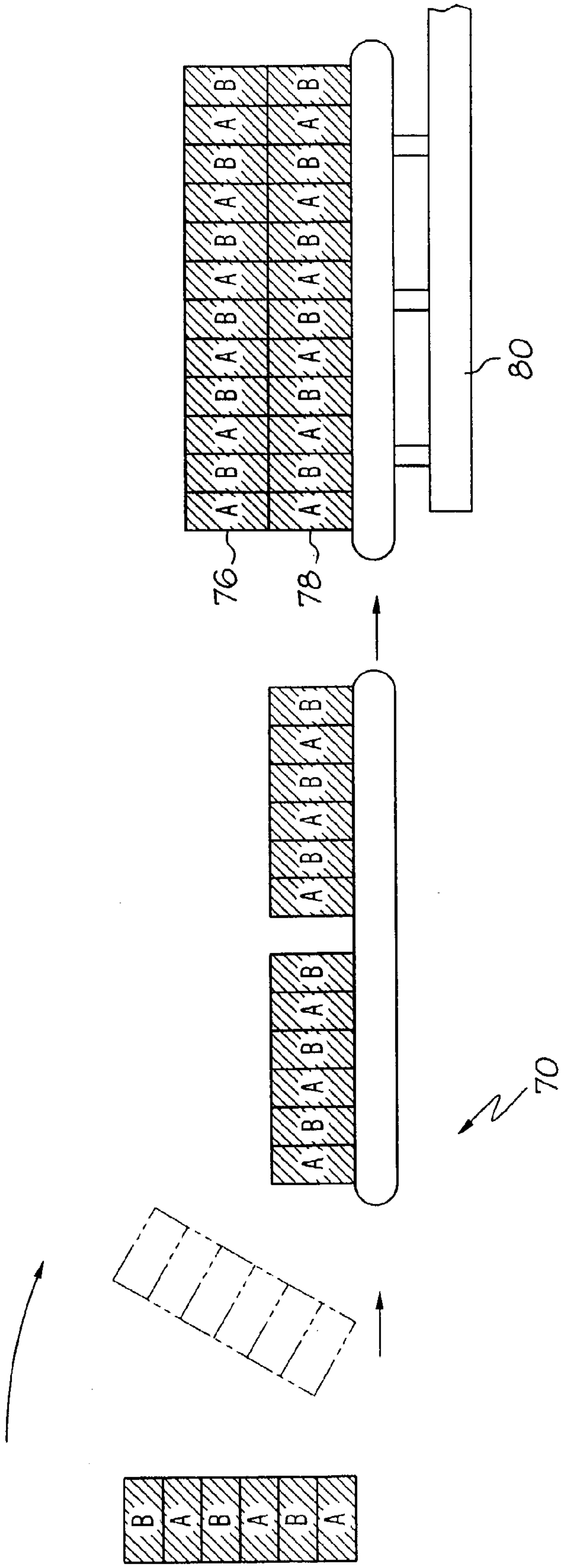

Referring now to FIG. 7B, a stacking assembly 70 is provided and is arranged to turn, and convey stack the succession of partially cured roof tiles of alternating roof tile types and stack the alternating roof tile types in succession onto a pallet 80. In this manner, the stacking assembly 70 forms a plurality of rows 76, 78 of stacked roof tiles. Subsequent rows are arranged on the pallet 80 to form a cubed product wherein each layer of the cubed product includes essentially equal quantities of the two different roof tile types A, B. It is contemplated by the present invention that the tiles may also be initially arranged on the pallet 80 in columns, as opposed to rows, to obtain a similar result. For the purposes of describing and defining the present invention, it is noted that a cubed product comprises any stacked or palleted collection of individual products and is not limited to a stacked or palleted product having the exact dimensions of a cube.

As is clearly illustrated in FIG. 4, the two different roof tile types A, B are structurally different in that they define different layouts or physical dimensions by virtue of the fact that one of the roof tile types includes the cut-out portions 49 and the other does not.

Figure 8:
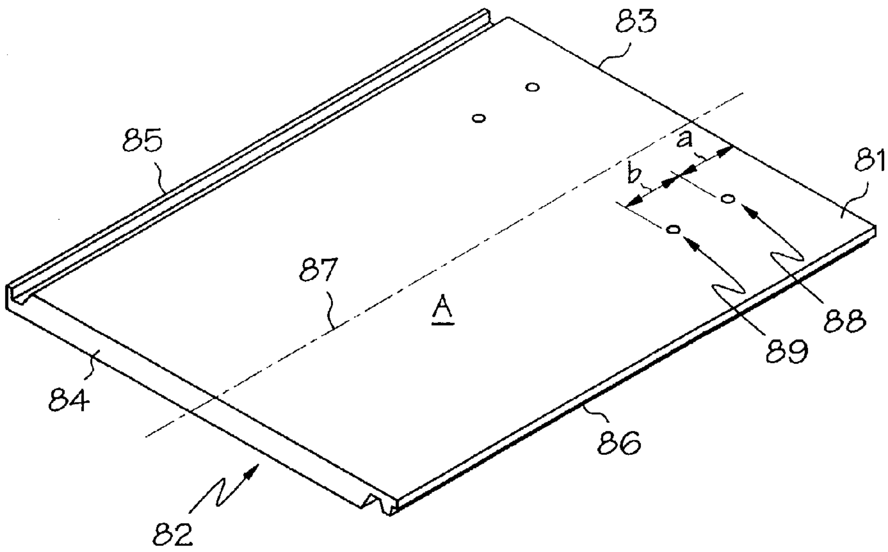
FIG. 8 is an illustration of a first roof tile type according to the present invention.

Referring now to FIG. 8, a type-A roof tile is illustrated. The roof tile A comprises a substantially planar upper surface 81, a contoured lower surface 82, a top edge 83, a bottom edge 84, an underlocking side edge 85, an overlooking side edge 86, a longitudinal tile axis 87 extending from the bottom edge 84 to the top edge 83, a first set of nail holes 88, and a second set of nail holes 89. The first set of nail holes 88 are provided in the upper surface 81 and are spaced a first distance a from the top edge 83. The second set of nail holes 89 are provided in the upper surface 81 and are spaced a second distance b from the first set of nail holes 88 along the longitudinal tile axis 87. In the illustrated embodiment, the first set of nail holes 88 and the second set of nail holes 89 are aligned along the longitudinal tile axis 87. Accordingly, the roof tile A of the present invention may be secured to a roof in a staggered or a non-staggered relationship with adjacent roof tiles because it includes the two sets of nail holes 88, 89 offset from the top edge 83 of the roof tile A by two different distances.

Figure 9:
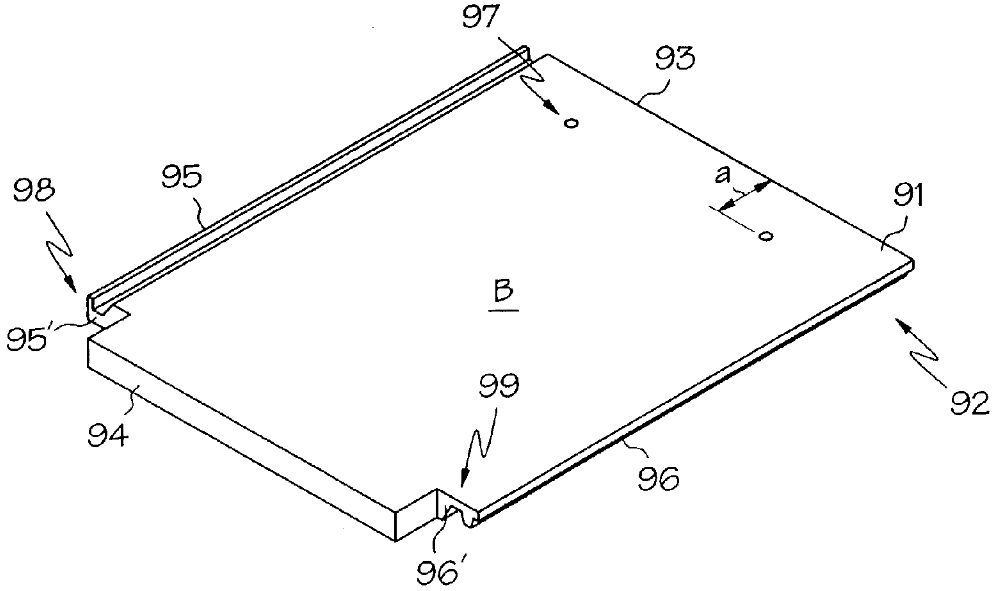
FIG. 9 is an illustration of a second roof tile type according to the present invention.

Referring now to FIG. 9, a type-B roof tile is illustrated. The roof tile B comprises a substantially planar upper surface 91, a contoured lower surface 92, a top edge 93, a bottom edge 94, an underlocking side edge 95, an overlooking side edge 96, a pair of nail holes 97 provided in the upper surface 91 and extending at least partially through the roof tile B, and first and second generally rectangular cut-out portions 98, 99 formed along the respective underlocking and overlooking side-edges 95, 96. The pair of nail holes 97 are provided in the upper surface 91 and are spaced the distance a from the top edge 93. The first generally rectangular cut-out portion 98 is formed along the underlocking side edge 95 and extends from the bottom edge 94 in the direction of the top edge 93. The second generally rectangular cut-out portion 99 is formed along the overlooking side edge 96 and extends from the bottom edge 94 in the direction of the top edge 93. The first cut-out portion 98 and the second cut-out portion 99 extend substantially the same distance from the bottom edge 94 along the respective side edges 95, 96. The first cut-out portion 98 is formed substantially within an underlock portion 95' formed along the underlocking side edge 95. Similarly, the second cut-out portion 99 is formed substantially within an overlock portion 96' formed along the overlooking side edge 96.

Figure 10:
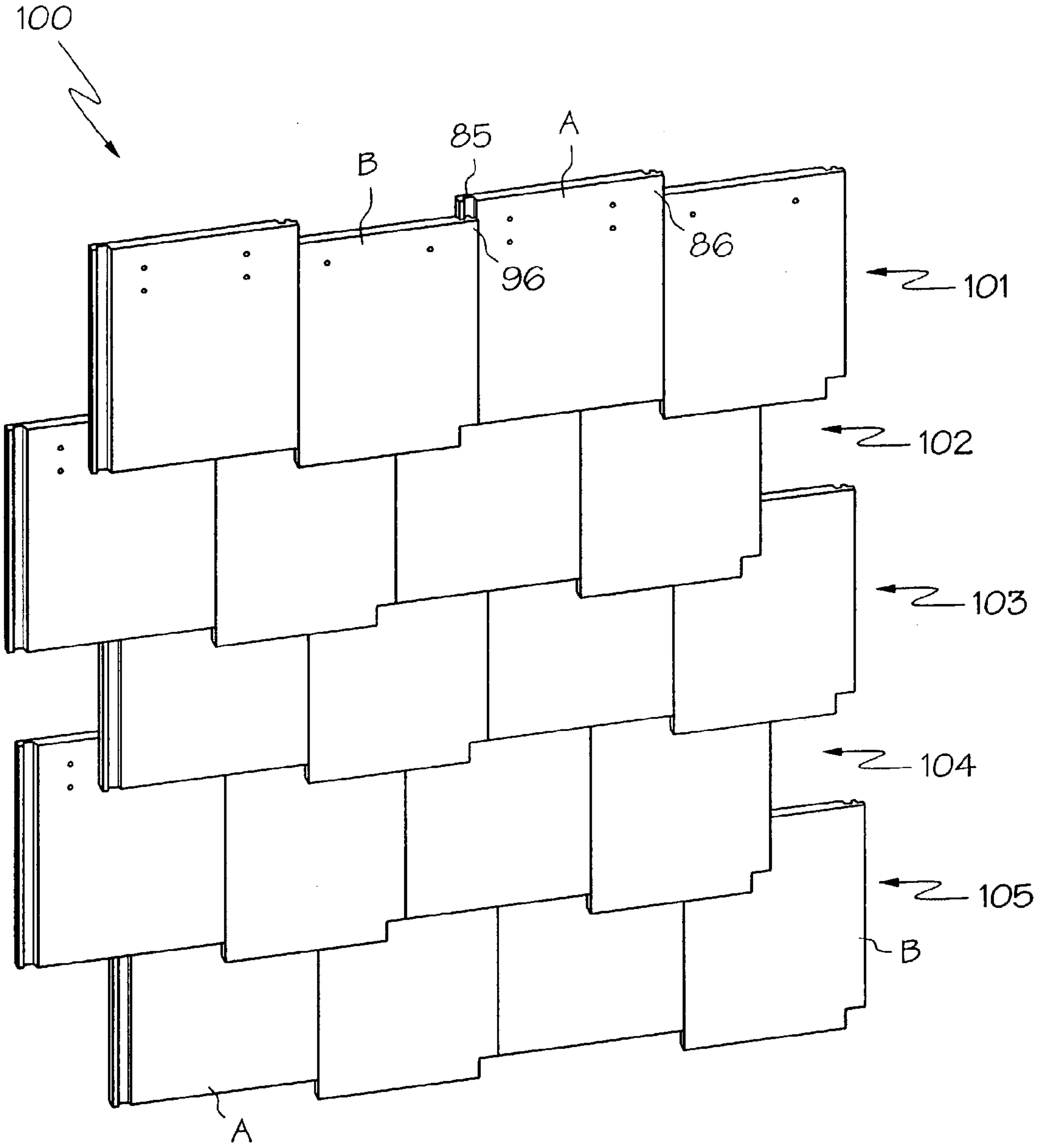
FIGS. 10 and 11 are illustrations of a roof tile layout according to the present invention.
Figure 11:
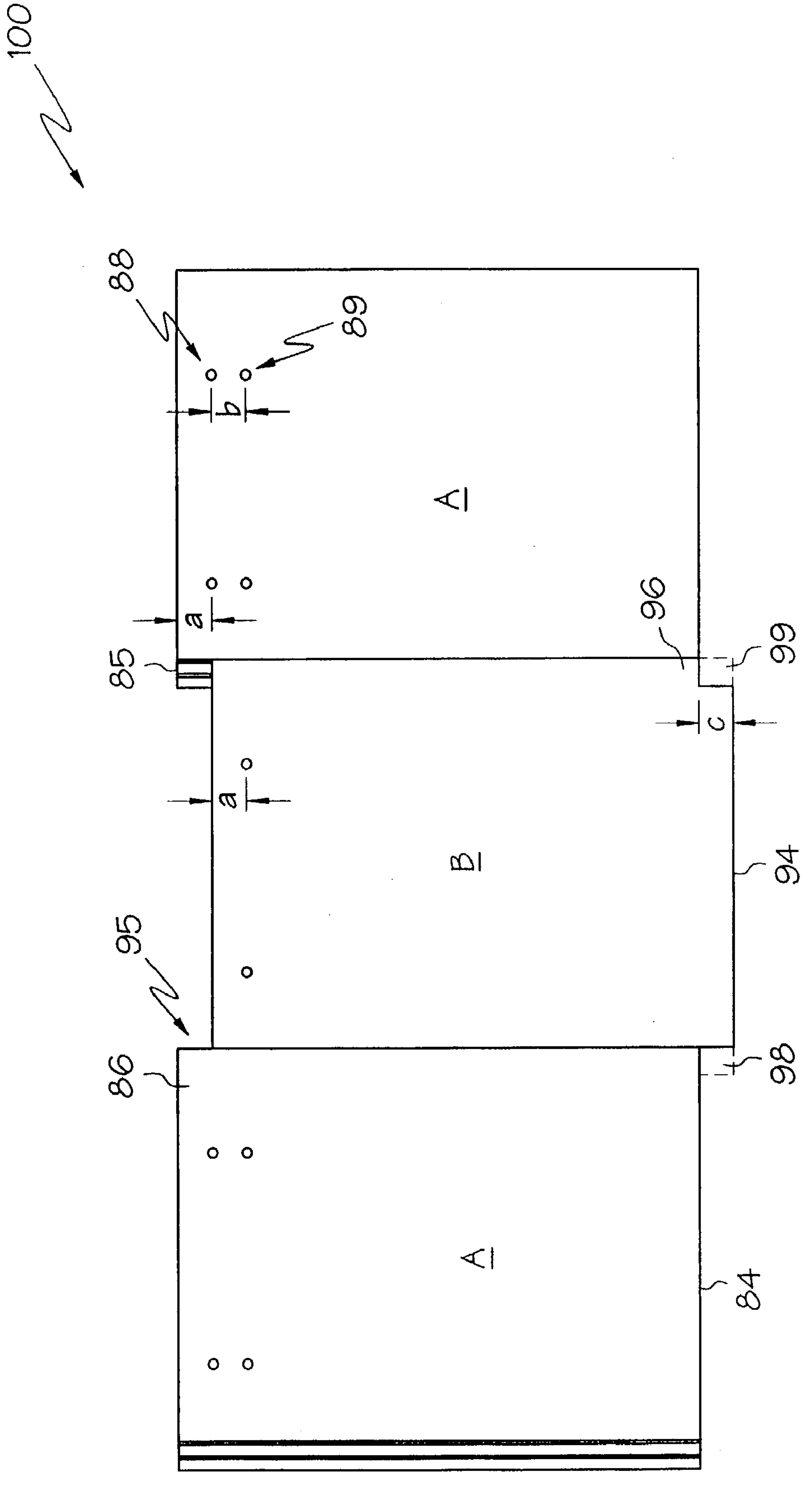

Referring now to FIGS. 10 and 11, a staggered roof tile layout 100 according to the present invention is illustrated. The roof tile layout 100 comprises, a plurality of roof tiles A, B arranged in series of tile rows 101–105. Each tile row 101–105 includes an alternating succession of the first roof tile type A, see FIG. 8, and the second roof tile type B, see FIG. 9. The underlocking side edge 85 of the first roof tile type A engages an overlooking side edge 96 of an adjacent tile of the second roof tile type B. Similarly, the overlooking side edge 86 of the first roof tile type A engages an underlocking side edge 95 of an adjacent tile of the second roof tile type B, and so on, across each tile row 101–105 in the roof tile layout 100. The visible surface of the roof tiles A and B, or any roof tiles, when arranged in a roof tile layout in the manner illustrated, staggered or un-staggered, is referred to herein as the show surface.

The first cut-out portion 98 of the second roof tile type B extends from the bottom edge 94 of the tile of the second type B as far as the bottom edge 84 of an adjacent tile of the first type A. In this manner, the bottom edge 84 of the adjacent tile of the first type A may be aligned with a top-most extent of the first cut-out 98 formed in the tile of the second type B while being substantially misaligned relative to the bottom edge 94 of the adjacent tile of the second type B. Similarly the second cut-out portion 99 of the second roof tile type B extends from the bottom edge 94 of the tile of the second type B as far as the bottom edge 84 of an adjacent tile of the first type A. In this manner, the bottom edge 84 of the adjacent tile of the first type A is substantially aligned with a top-most extent of the second cut-out 99 formed in the tile of the second type B while being substantially misaligned relative to the bottom edge 94 of the adjacent tile of the second type B. The resulting roof tile layout 100, where the tops of the respective cut-outs 98, 99 along a single row 101–105 may be aligned against the bottom edge 84 of the adjacent tile of the first type A, provides for a precisely staggered roof tile layout 100 having an improved aesthetic appearance.

To improve the ease by which the roof tile layout 100 may be installed, the first set of nail holes 88 and the second set of nail holes 89 are separated along the longitudinal tile axis 87 by a distance b that is equal to the extent c of the first and second cut-out portions 98, 99 along the respective tile edges 95, 96. In this manner, successive roof tiles in a selected roof tile row 101–105 may be secured to the roof along substantially the same nailing line across the roof, while maintaining the staggered relationship of adjacent roof tiles within a single roof tile row 101–105.

Figure 12:
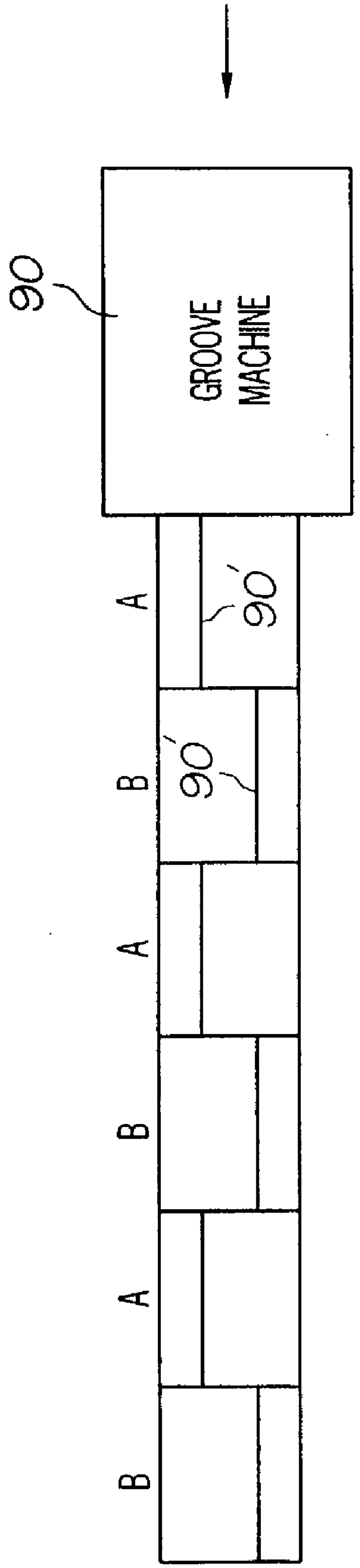
FIG. 12 illustrates a process according to the present invention wherein respective grooves are imparted onto the respective show surfaces of the roof tiles.

Referring now to FIG. 12, a process and apparatus for imparting a visible groove 90' into the show surface of each roof tile of a succession of roof tiles is illustrated. Specifically, a groove machine 90 is arranged to impart successive grooves 90' in different positions on alternate tiles. It is contemplated by the present invention that the position of the alternating grooves on each tile could be selected randomly or uniformly. Roof tiles processed in this nature are particularly advantageous when used in the roof tile layout 100 of FIGS. 10 and 11 because the grooves help to create a perception that the tiles are not pre-fabricated and relatively uniform roof tiles.

Having described the invention in detail and by reference to preferred embodiments thereof, it will be apparent that modifications and variations are possible without departing from the scope of the invention defined in the appended claims.

What is claimed is:

1. A process of manufacturing roof tiles comprising the steps of:

extruding a composite ribbon such that said composite ribbon defines an upper surface, a lower surface, and a pair of opposite ribbon side edges;

conveying said composite ribbon from an upstream position to a downstream position along a composite ribbon path;

demarcating said composite ribbon into an alternating succession of a first roof tile type and a second roof tile type by engaging said composite ribbon with an upstream cutting blade and a downstream cutting blade such that each roof tile type is demarcated at an upstream tile edge by one of said cutting blades and at a downstream tile edge by the other of said cutting blades, and such that a selected one of said roof tile types includes a pair of cut-out portions demarcated along one of said upstream and downstream tile edges, said pair of cut-out portions being positioned on opposite ones of said ribbon side edges;

separating said succession of demarcated roof tile types into distinct roof tiles; and curing said distinct roof tiles to form a set of cured roof tiles.

2. A process of manufacturing roof tiles as claimed in claim 1, further comprising:

forming a first set of nail holes in said composite ribbon such that said first set of nail holes are spaced a first distance from one of said upstream and downstream tile edges;

forming a second set of nail holes in said composite ribbon such that said second set of nail holes are spaced a second distance from said first set of nail holes along said composite ribbon path;

forming said pair of cut-out portions in said second roof tile type; and forming a first set of nail holes in said second roof tile type such that said first set of nail holes in said second roof tile type are spaced said first distance from one of said upstream and downstream tile edges.

3. A process of manufacturing roof tiles as claimed in claim 2 wherein said composite ribbon is demarcated such that said pair of cut-out portions extend said second distance from the other of said second roof tile type upstream and downstream file edges along said composite ribbon path, whereby the spacing between the first and second sets of nail holes on said first roof tile type along said composite ribbon pat matches the extent of said cut-out portions on said second roof tile type along said composite ribbon path.

4. A process of manufacturing roof tiles as claimed in claim 2 wherein said composite ribbon is demarcated such that said nail holes extend through said composite ribbon between the upper surface and the lower surface.

5. A process of manufacturing roof tiles as claimed in claim 1 further comprising the steps of conveying a succession of partially cured roof tiles of alternating roof tile types; and stacking said alternating roof tile types in succession to form a cubed product wherein each layer of the cubed product includes equal quantities of the two different roof tile types.

6. A process of manufacturing roof files as claimed in claim 1 wherein said roof tiles are partially cured by said step of curing said roof tiles.

7. A process of manufacturing roof tiles as claimed in claim 1 wherein said demarcating step comprises engaging said composite ribbon substantially simultaneously with said upstream cutting blade and said downstream cutting blade.

8. A process of manufacturing roof tiles as claimed in claim 1 wherein said demarcating step comprises conveying said cutting blade assembly in a direction parallel to said composite ribbon path as said demarcating step is executed.

9. A process of manufacturing roof tiles as claimed in claim 1 further comprising the step of imparting a groove on one of said surfaces of each roof tile type of said alternating succession of roof tile types, wherein said groove is substantially parallel to said opposite ribbon side edges, and wherein the position of said groove in adjacent roof tiles varies.

10. A process of manufacturing roof tiles as claimed in claim 1 wherein said composite ribbon is demarcated such that said first roof tile type is demarcated at an upstream tile edge by said downstream cutting blade and at a downstream tile edge by said upstream cutting blade, and such that said second roof tile type is demarcated at an upstream tile edge by said upstream cutting blade and at a downstream tile edge by said downstream cutting blade.

11. A process of manufacturing roof tiles as claimed in claim 1 wherein said composite ribbon is demarcated such that said first roof tile type is demarcated at an upstream tile edge by said upstream cutting blade and at a downstream tile edge by said downstream cutting blade, and such that said second roof tile type is demarcated at an upstream tile edge by said downstream cutting blade and at a downstream tile edge by said upstream cutting blade.

12. A process of manufacturing roof tiles as claimed in claim 1 wherein said composite ribbon is demarcated such that an upstream tile edge of said first roof tile type is adjacent to a downstream tile edge of said second tile type.

13. A process of manufacturing roof tiles as claimed in claim 1 wherein said composite ribbon is demarcated such tat an upstream tile edge of said second roof tile type is adjacent to a downstream tile edge of said first tile type.

14. A process of manufacturing roof tiles comprising the steps of:

extruding a composite ribbon such that said composite ribbon defines an upper surface, a lower surface, and a pair of opposite ribbon side edges;

conveying said composite ribbon from an upstream position to a downstream position along a composite ribbon path; and demarcating said composite ribbon into an alternating succession of a first roof tile type and a second roof tile type by engaging said composite ribbon with an upstream cutting blade and a downstream cutting blade such that each roof tile type is demarcated at an upstream tile edge by one of said cutting blades and at a downstream tile edge by the other of said cutting blades, and such that a selected one of said roof tile types includes a pair of cut-out portions demarcated along one of said upstream and downstream tile edges, said pair of cut-out portions being positioned on opposite ones of said ribbon side edges.

* * * * *

UNITED STATES PATENT AND TRADEMARK OFFICE

CERTIFICATE OF CORRECTION

PATENT NO. : 7,060,212 B2
APPLICATION NO. : 10/409802
DATED : June 13, 2006
INVENTOR(S) : Bane et al.

It is certified that error appears in the above-identified patent and that said Letters Patent is hereby corrected as shown below:

Col. 1, Line 47 "interlocking and overlooking" should read --interlocking and overlocking--
Col. 4, Line 2 "edge, an overlooking" should read --edge, an overlocking--
Col. 4, Line 9 "along the overlooking" should read --along the overlocking--
Col. 4, Line 21 "along the overlooking" should read --along the overlocking--
Col. 4, Line 26 "edge, an overlooking" should read --edge, an overlocking--
Col. 4, Line 42 "and an overlooking" should read --and an overlocking--
Col. 4, Line 44 "edge, an overlooking" should read --edge, an overlocking--
Col. 4, Line 51 "along the overlooking" should read --along the overlocking--
Col. 4, Line 57 "engages an overlooking" should read --engages an overlocking--
Col. 4, Line 58 "The overlooking side" should read --The overlocking side--
Col 4, Line 61 "engages an overlooking" should read --engages an overlocking--
Col 4, Line 63 "overlooking side" should read --overlocking side--
Col. 8, Line 66/67 "an overlooking side" should read --an overlocking side--
Col 9, Line 18/19 "an overlooking side" should read --an overlocking side--
Col. 9, Line 23 "and overlooking side-edges" should read --an overlocking side-edges--
Col. 9, Line 29 "along the overlooking" should read --along the overlocking--
Col. 9, Line 38 "along the overlooking" should read --along the overlocking--
Cot. 9, Line 46 "engages an overlooking" should read --engages an overlocking--
Col. 9, Line 47 "Similarly, the overlooking" should read --Similarly, the overlocking--
Col. 11, Line 33 "roof files' should read --roof tiles--

Signed and Sealed this

Fourteenth Day of November, 2006

JON W. DUDAS
*Director of the United States Patent and Trademark Office*